United States Patent [19]

Hulsey

[11] 4,155,574
[45] May 22, 1979

[54] SIMPLIFIED PIPE COUPLING

[75] Inventor: Theodore Hulsey, Springfield, Mo.

[73] Assignee: Plessey Incorporated, New York, N.Y.

[21] Appl. No.: 898,916

[22] Filed: Apr. 21, 1978

[51] Int. Cl.$^2$ .................. B65D 63/02; F16L 21/00; F16L 21/06; F16L 55/16

[52] U.S. Cl. .................. 285/236; 24/274 R; 24/279; 138/96 R; 138/96 T; 138/99; 285/373; 285/419

[58] Field of Search ............... 285/236, 373, 419, 365, 285/366, 367, 410; 24/279, 284, 274 R; 138/99, 96 R, 96 T

[56] References Cited

U.S. PATENT DOCUMENTS

| | | | |
|---|---|---|---|
| 141,536 | 8/1873 | Bellemere et al. | 138/99 |
| 1,255,417 | 2/1918 | Hedges | 285/419 |
| 1,360,005 | 11/1920 | Moore | 285/365 X |
| 1,874,731 | 8/1932 | Younce | 24/274 R X |
| 2,395,273 | 2/1946 | Hill et al. | 24/274 R |
| 2,408,347 | 9/1946 | Sprouse | 24/274 R |
| 3,233,922 | 2/1966 | Evans | 285/367 X |
| 3,359,017 | 12/1967 | Schaub | 285/236 |
| 3,528,142 | 9/1970 | Lodholm | 24/274 R |
| 3,565,468 | 2/1971 | Garrett | 285/373 |
| 3,627,353 | 12/1971 | Blumenfeld et al. | 285/236 X |
| 3,750,241 | 8/1973 | Bootha | 24/279 |

FOREIGN PATENT DOCUMENTS

| | | | |
|---|---|---|---|
| 13709 of | 1901 | United Kingdom | 138/99 |
| 580186 | 8/1946 | United Kingdom | 24/274 R |

Primary Examiner—Mervin Stein
Assistant Examiner—Carl F. Pietruszka
Attorney, Agent, or Firm—James J. Burke, II

[57] ABSTRACT

A pipe-encircling steel shield includes integral bands with inclined slots for engagement with screw-type tightening elements. The shield compresses a gasket or packing member against the pipe ends to be coupled. This structure reduces the number of parts in comparable couplings by about one-half. The shield area preferably includes longitudinal slots which trap gasket material during tightening, facilitating use with irregular pipe sections.

5 Claims, 3 Drawing Figures

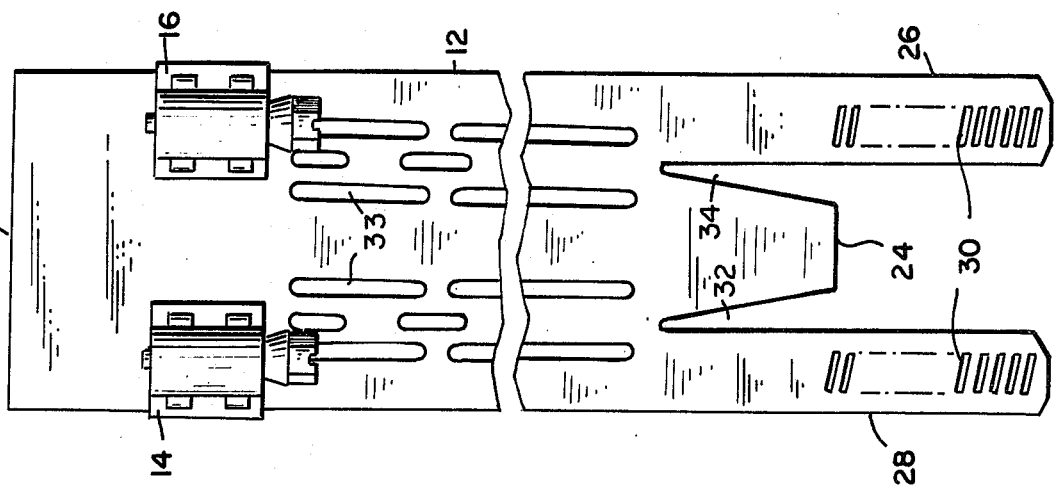
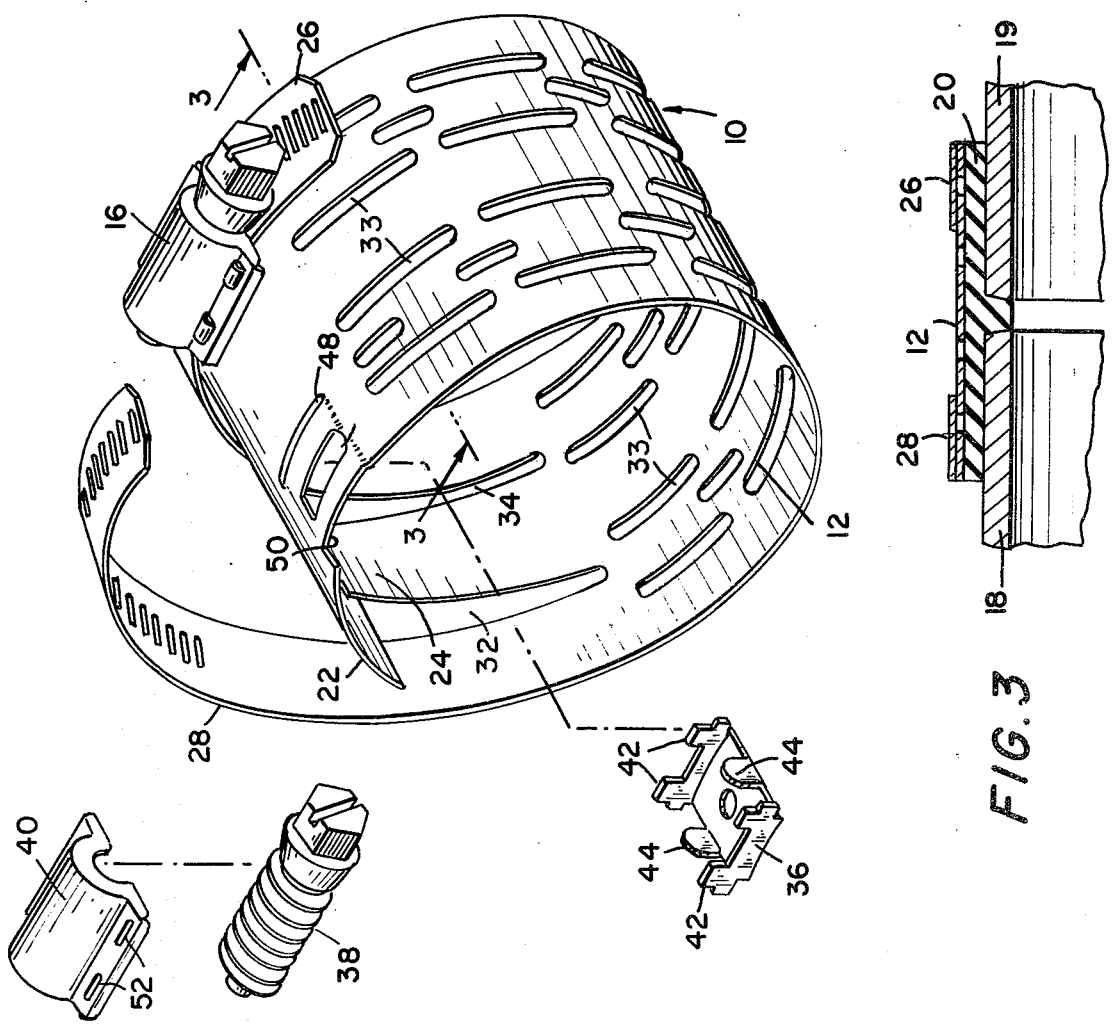

SIMPLIFIED PIPE COUPLING

BACKGROUND OF THE INVENTION

This invention relates to couplings used as pipe joints, and more particularly it relates to couplings for pipes having identical ends to be butted together. Since such pipes have no hubs, bells or spigots, the couplings are sometimes referred to as "no-hub" couplings.

Couplings of this general type are disclosed by Evans, U.S. Pat. No. 3,233,922, and by Schaub, U.S. Pat. No. 3,359,017. Both disclose a gasket or packing member which encircles the pipe (and eliminates the need for caulking), a corrugated shield having a lapped and a lapping end, two clamping bands attached to the shield along opposite edges and having inclined slots at one end and screw tightening elements at the other. The two disclosures differ in the shape and extent of the corrugations, and the number and position of the rivets used to attach the bands to the shield.

The stated purposes of the corrugations and separate bands are to equalize pressures and accommodate irregular pipes. I have determined that in the great majority of cases these are non-existent problems. More particularly, I have determined that perfectly satisfactory couplings can be made from an integral shield/band member. In this manner, the cost of the coupling is substantially reduced.

OBJECTS OF THE INVENTION

The principle object of the present invention is to provide a lower cost no-hub coupling.

Another object of the present invention is to provide a pipe coupling for no-hub pipes having fewer parts and that is simpler to assemble than known couplings.

Various other objects and advantages of the invention will become clear from the following description of a preferred embodiment, and the novel features will be particularly pointed out in connection with the appended claims.

THE DRAWINGS

Reference will hereinafter be made to the accompanying drawings, wherein:

FIG. 1 is an exploded perspective view of the integral band/shield member of the preferred embodiment, including the screw-tightening elements;

FIG. 2 is a plan view of the integral band/shield member; and

FIG. 3 is a cross-sectional view showing the preferred embodiment, including the gasket, on pipe ends.

DESCRIPTION OF EMBODIMENTS

With reference to FIGS. 1 and 2, the coupling 10 of the present invention comprises a shield 12 of stamped steel and two screw tightening elements 14, 16. In use, it is secured around a pipe ends 18, 19 with with a packing member or gasket 20 therebetween (FIG. 3). Shield 12 is preferably stainless steel.

Shield 12 includes a lapping end 22, a lapped end 24, and two integral band elements 26,28 on the lapped end 24 that include inclined slots 30 for engagement with tightening elements 14, 16. Shield 12 is longitudinally slit 32, 34 so that lapped end 24 can slide under lapping end 22 (FIG. 1) while bands 26, 28 go over end 22 and engage tightening elements 14, 16.

The tightening elements 14, 16 are not part of the invention per se, but a preferred type is shown in exploded perspective in FIG. 1, the same having been marketed on hose clamps etc. by applicant's assignee and predecessor companies under the trademark ASTRO CLAMP for many years. Tightener 14 has three parts: a shoe or bracket 36, a helical screw 38, and a cover or cap element 40. Bracket 36 is provided with upwardly extending longitudinal tabs 42 and cross-wise tabs 44. Shield 12 has a broad slot 46 to accommodate screw 38 and a narrow, longitudinal slot 48 parallel to and spaced from slot 46. Tabs 44 extend up through the ends of slot 46 and are bent over to secure bracket 36 to shield 12. Tabs 42 extend up through slot 48 and around the edge 50 of shield 12, and through cooperating slots 52 on cover 40. After helical screw 38 is in place, cover 40 is placed thereover and tabs 42 are bent over, completing the assembly.

The packing member or gasket 20, which is made of a suitable resilient material, is cut to fit and wrapped about the almost-abutting ends of pipe 18, 19. Shield 12 is then wrapped thereover, lapping end 22 going over lapped end 24, and bands 26, 28 passing through tightening elements 14, 16 which are screwed up until a tight coupling is achieved. The resiliency of gasket 20 allows for minor dimensional variations, and no trouble has been experienced in terms of resistance to a good, tight, coupling by virtue of the fact that, as the screws are tightened, frictional resistance to sliding motion between the lapped and lapping ends presumably increases (the lapping end 22 moves over the lapped end 24, and the latter does not slide in relation to gasket 20).

Two preferred features of the invention assist in making good couplings even with irregular pipe sections. First, lapped end 24 is preferably tapered. With this feature, one tightening element can be tightened more than the other, and lapped end 24 can move slightly left or right without binding against bands 26,28. Second, shield 12 is preferably provided with a plurality of longitudinal slots 33. These allow the coupling to more readily conform to irregularly shaped pipe and, just as important, trap gasket material at a right angle to the direction of potential pipe separation, thereby increasing mechanical strength of the coupling.

Various changes in the details, steps, materials, and arrangements of parts, which have been herein described and illustrated in order to explain the nature of the invention, may be made by those skilled in the art within the principle and scope of the invention as defined in the appended claims.

What is claimed is:

1. A coupling for joining two pipe sections in end-to-end alignment comprising:
    a flexible shield adapted to surround adjacent ends of said pipe sections with the longitudinal ends of said shield including a lapping end and a lapped end;
    a pair of band elements integral with said shield, extending longitudinally alongside as well as beyond said lapped end;
    a pair of tightening elements fixed near the lapping end of said shield along the longitudinal sides thereof and adapted to engage the respective ends of said extending band elements;
    a resilient annular packing member adapted to be interposed between said shield and the junction of said pipe ends;
    said tightening elements including means of drawing said band elements therethrough, whereby longitudinal edges of said shield may be compressed against said packing member and around said pipe sections.

2. The coupling as claimed in claim 1, wherein said shield and integral band elements are fabricated from stainless steel.

3. The coupling as claimed in claim 1, wherein said lapped end is tapered.

4. The coupling as claimed in claim 1, and additionally comprising a plurality of longitudinal slots in siad shield.

5. A shield member for a pipe coupling comprising:

a flat strip of flexible steel including a lapped end and a lapping end, said lapped end being tapered;
a pair of integral band elements extending longitudinally alongside as well as beyond said lapped end;
each said band element having a plurality of parallel slots at an angle to the sides of said band;
a plurality of longitudinal slots in said shield;
a pair of helical-screw tightening elements fixed to said shield near the lapping end thereof along the longitudinal sides of said strip and adapted to engage said respective band elements, said screw adapted to engage said parallel slots to draw said bands through said tightening elements.

* * * * *